United States Patent [19]

Miedema

[11] 4,412,350
[45] Oct. 25, 1983

[54] METHOD AND APPARATUS FOR DISTINGUISHING BETWEEN MINIMUM AND NON-MINIMUM PHASE FADES

[75] Inventor: Hotze Miedema, Boxford, Mass.

[73] Assignee: Bell Telephone Laboratories, Incorporated, Murray Hill, N.J.

[21] Appl. No.: 335,729

[22] Filed: Dec. 30, 1981

[51] Int. Cl.³ .................. H04B 1/10; H04B 15/00
[52] U.S. Cl. ........................... 455/306; 455/52; 455/65
[58] Field of Search ............. 455/52, 65, 137–139, 455/303–306, 205; 375/40, 100

[56] References Cited

U.S. PATENT DOCUMENTS 3,537,008 10/1970 Lakatos .................................. 455/65
3,633,107 1/1972 Brady .................................... 455/52
4,330,764 5/1982 Miedema ............................. 455/304

OTHER PUBLICATIONS

"A New Selective Fading Model: Application to Propagation Data", by W. D. Rummler, pp. 1037–1053, BSTJ, vol. 58, No. 5, May–Jun. 1979.

Primary Examiner—Jin F. Ng
Attorney, Agent, or Firm—David R. Padnes

[57] ABSTRACT

The fade character of a transmitted radio signal comprising an amplitude or phase modulated double-sideband signal is determined from the algebraic sign of the fade induced modulation and the location of the fade notch ($\omega_f$) relative to the center ($\omega_c$) of the double-sideband signal frequency spectrum. In the disclosed embodiment, the algebraic sign of the fade induced modulation is determined (e.g., 402, 403, 404, 405, 406, 409, 410, 411, 412, 413, 417) from the sign of the dc component of the product of the differentiated amplitude modulation and frequency modulation of the received signal. The relative location of the fade notch is determined by comparing the amplitudes (e.g., 402, 404, 405, 406, 415) of corresponding frequency components in each sideband of the received double-sideband signal.

12 Claims, 4 Drawing Figures

TWO PATH FADE PHASE SHIFT VS FREQUENCY

SIGNAL PROCESSOR

METHOD AND APPARATUS FOR DISTINGUISHING BETWEEN MINIMUM AND NON-MINIMUM PHASE FADES

TECHNICAL FIELD

The present invention relates to radio communications systems and, more particularly, to a method and an apparatus for distinguishing between minimum and non-minimum phase fades.

BACKGROUND OF THE INVENTION

Multipath fading occurs when a radio signal propagates along more than one path to the receiver. This phenomenon is caused by a variety of atmospheric conditions, such as temperature, humidity or air pressure gradients. In the majority of cases, the received signal during multipath fading can be represented as the result of signal propagation over a direct path and an indirect path. The signal delay associated with the indirect path is greater than that of the direct path. In communications systems, fading is undesirable because it can produce amplitude and/or delay distortion in the received signal. This distortion can be a major source of transmission deterioration which, under certain conditions, can exceed system performance objectives.

When we represent multipath fading by a two-path model, fading is characterized as being minimum or non-minimum phase fade. During a minimum phase fade, the amplitude of the signal propagating over the indirect path is less than the amplitude of the signal propagating over the direct path. Conversely, non-minimum phase fading occurs when the amplitude of the indirect path signal is greater than the amplitude of the direct path signal. It should, of course, be understood that this characterization of fading is a function of time and is basically unpredictable.

It has been found that automatic gain control as well as space diversity techniques are not adequate to maintain satisfactory transmission performance in the presence of fading. Recent efforts have centered on the use of equalization to mitigate fading effects and achieve the required level of system performance. Since fading is unpredictable, the compensation provided by a fade equalizer must be capable of automatically adapting for changing signal conditions. One such adaptive equalizer is disclosed by applicant in a U.S. Pat. application, Ser. No. 158,404, filed June 11, 1980, now U.S. Pat. No. 4,330,764 issued May 18, 1982 and assigned to applicant's assignee. This equalizer compensates for amplitude distortion as well as delay distortion during minimum phase fade conditions. However, it does not provide proper delay equalization for non-minimum phase fade. In fact, for non-minimum phase fade the equalizer doubles the delay distortion in the received signal. In another equalizer design disclosed by P. Karabinis in a U.S. Patent application, Ser. No. 293,463, filed Aug. 17, 1981 and assigned to applicant's assignee, the equalizer parameters are modified by the character of the multipath fading. Detecting the character of the fading, however, requires rather complex circuitry.

SUMMARY OF THE INVENTION

The present invention determines the fade character of a received signal in radio communications systems wherein the transmitted signal comprises an amplitude modulated or phase modulated double-sideband signal. Determining the fade character relies on the fact that the phase dispersion associated with fading produces phase modulation to amplitude modulation conversion in a phase modulated signal and amplitude modulation to phase modulation conversion in an amplitude modulated signal. Accordingly, if a phase modulated or amplitude modulated double-sideband signal is transmitted, the received signal comprises amplitude modulation and phase modulation during fading.

Pursuant to the present invention, the fade character is determined from the algebraic sign of the fade induced amplitude modulation or phase modulation of the received double-sideband signal and the location of the fade notch frequency relative to the center of the double-sideband signal frequency spectrum. In the disclosed embodiment, the algebraic sign of the fade induced modulation is ascertained from the algebraic sign of the dc component of the product of the differentiated amplitude modulation and frequency modulation of the received double-sideband signal. The relative location of the fade notch frequency is established by comparing the amplitudes of corresponding frequency components in each sideband of the received double-sideband signal.

DETAILED DESCRIPTION

Figure 1:
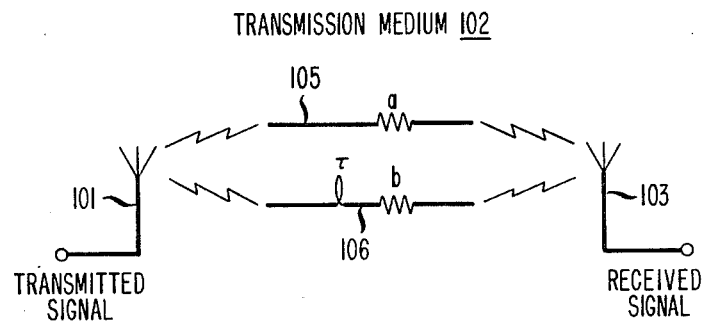
FIG. 1 is a portion of a radio communication system comprising a two-path medium.

FIG. 1 shows a portion of a radio communication system including a transmission source 101, a multipath transmission medium 102, and a receiver 103. For a moderately broadband system, the transmission medium can be represented by a two-path model. Accordingly, medium 102 is shown to include a direct path 105 and an indirect path 106 between source 101 and receiver 103. During multipath fading, the incoming signal at the receiver comprises a "direct" signal which propagates along direct path 105 and an "indirect" signal which propagates along indirect path 106. Direct path 105 is characterized by a gain factor a and indirect path 106 is characterized by a gain factor b and relative delay $\tau$. Delay $\tau$ and gain factors a and b all vary as a function of time.

The received signal, $R(j\omega)$ is a complex function which can be expressed as:

$$R(j\omega) = a(1 - \alpha e^{-j(\omega - \omega_f)\tau})T(j\omega) \tag{1}$$

where $T(j\omega)$ is the transmitted signal which is also a complex function;

$-j(\omega - \omega_f)\tau$ $1 - \alpha e$ is the normalized transfer function of the multipath medium;

a is a scale parameter;

$\alpha$ is an amplitude ratio equal to b/a;

$\tau$ is the delay difference between the direct and the indirect paths; and $\omega_f$ is the fade notch frequency.

Rewriting equation (1) as the sum of sines and cosines, the received signal can be expressed as:

$$R(j\omega) = Ae^{j\phi(\omega)}T(j\omega) \quad (2)$$

where A is the amplitude function defined as:

$$A = \{[1 - \alpha\cos((\omega - \omega_f)\tau)]^2 + [\alpha^2\sin^2((\omega - \omega_f)\tau)]^2\}^{\frac{1}{2}} \quad (3)$$

and $\phi(\omega)$ is the phase function of the two-path fade defined as:

$$\phi(\omega) = \tan^{-1}\frac{\alpha\sin((\omega - \omega_f)\tau)}{1 - \alpha\cos((\omega - \omega_f)\tau)}. \quad (4)$$

Figure 2:
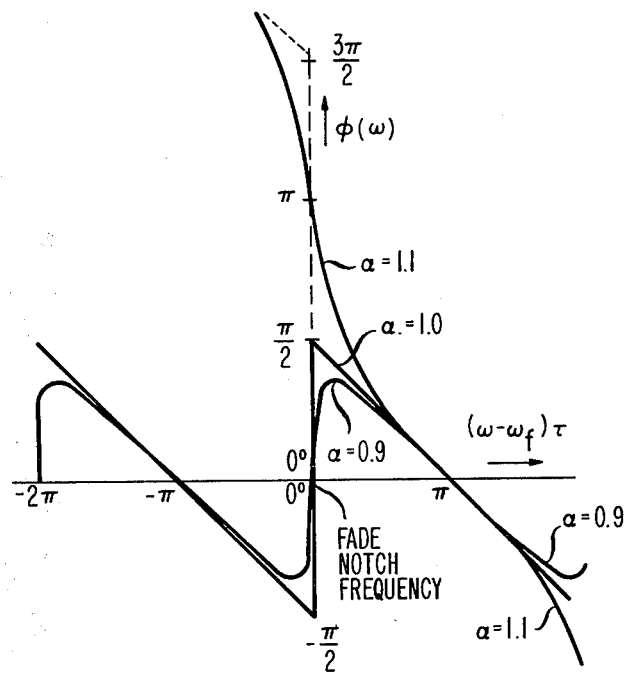
FIG. 2 is a plot of the two-path fade phase shift vs frequency.

For minimum phase fade $\alpha < 1$ and for non-minimum phase fade $\alpha > 1$. FIG. 2 shows $\phi(\omega)$ plotted as a function of $(\omega - \omega_f)\tau$ for $\alpha = 0.9$, $\alpha = 1.1$. This plot indicates that the phase shift is most sensitive to the fade character around the fade notch frequency.

Fading also produces a modulation conversion. For example, it will produce phase modulation to amplitude modulation conversion in a phase modulated signal and will produce amplitude modulation to phase modulation conversion in an amplitude modulated signal. Hence, if a transmitted signal comprises a phase modulated or amplitude modulated signal, the received signal has both amplitude modulation and phase modulation. If a phase modulated or amplitude modulated signal is transmitted, the following discussion will demonstrate that the fade character can be determined from the algebraic sign of the fade induced modulation and the location of the fade notch frequency.

Consider the case of a transmitted phase modulated signal. Here we can expect phase modulation to amplitude modulation conversion. We will assume that by suitable choice of signal spectrum samples or by the use of pilot tones we can create a transmitted signal $T(\omega)$ which can be expressed by:

$$T(\omega) = \cos\omega_c t - \epsilon\sin(\omega_c - \Delta)t - \epsilon\sin(\omega_c + \Delta)t \quad (5)$$

where $\epsilon << 1$;
$\omega_c$ is a frequency of the transmitted signal spectrum; and
$\Delta$ is the modulation frequency.
Equation (5) represents a double-sideband phase modulated signal where the first term is the center component at frequency $\omega_c$ and the second and third terms represent the lower and upper sidebands at frequencies $\omega_c - \Delta$ and $\omega_c + \Delta$.

If the signal of equation (5) is transmitted, fading will cause amplitude and phase dispersion which will result in a received signal R of the form:

$$R = A_2\cos(\omega_c t + \phi_2) - \epsilon A_1\sin[(\omega_c - \Delta)t + \phi_1] - \epsilon A_3\sin[(\omega_c + \Delta) + \phi_3]; \quad (6)$$

where $A_1$, $A_2$ and $A_3$ respectively represent the amplitude distortion of the lower sideband, center component and upper sideband caused by fading; and $\phi_1$, $\phi_2$ and $\phi_3$ respectively denote the phase shift of the lower sideband, center component and upper sideband relative to their unfaded state.

By setting $A_2 = 1$ and equalizing the amplitudes of the lower and upper sidebands ($\epsilon A_1$ and $\epsilon A_3$) to $p << 1$ the amplitude modulation of the center component caused by unequal sideband amplitudes can be eliminated leaving only the amplitude modulation caused by phase dispersion. Performing this equalization and referencing all phase shifts to $\phi_2$ at $\omega_c$ transforms the received signal R of equation (6) into:

$$R = \cos\omega_c t - p\sin[(\omega_c - \Delta)t - \theta_1] - p\sin[(\omega_c + \Delta)t + \theta_3] \quad (7)$$
where $\theta_3 = \phi_3 - \phi_2$; and $\theta_1 = \phi_2 - \phi_1$.

The received signal of equation (7) can also be written as:

$$R = \left(1 + 2p\sin\frac{\theta_1 - \theta_3}{2}\cos\left(\Delta t + \frac{\theta_1 + \theta_3}{2}\right)\right) \times \quad (8)$$
$$\cos\left(\omega_c t + 2p\cos\frac{\theta_1 - \theta_3}{2}\cos\left(\Delta t + \frac{\theta_1 + \theta_3}{2}\right)\right).$$

where $2p\sin\frac{\theta_1 - \theta_3}{2}\cos\left(\Delta t + \frac{\theta_1 + \theta_3}{2}\right)$ is the amplitude modulation of the received signal;

$2p\sin\frac{\theta_1 - \theta_3}{2}$ is the magnitude of the amplitude modulation;

$2p\cos\frac{\theta_1 - \theta_3}{2}\cos\left(\Delta t + \frac{\theta_1 + \theta_3}{2}\right)$ is the phase modulation of the received signal; and $2p\cos\frac{\theta_1 - \theta_3}{2}$ is the magnitude of the phase modulation.

The equivalence of equations (7) and (8) can be demonstrated by noting that when $p << \pi/2$ equation (8) can be written as:

$$R = \left(1 + 2p\sin\frac{\theta_1 - \theta_3}{2}\cos\left(\Delta t + \frac{\theta_1 + \theta_3}{2}\right)\right) \times \quad (9)$$
$$\left(\cos\omega_c t - 2p\sin\omega_c t\cos\frac{\theta_1 - \theta_3}{2}\cos\left(\Delta t + \frac{\theta_1 + \theta_3}{2}\right)\right).$$

Equation 9 is obtained by expanding the term $$\cos\left(\omega_c t + 2p\cos\frac{\theta_1 - \theta_3}{2}\right) \text{ and noting that}$$

$$\cos\left(2p\cos\frac{\theta_1 - \theta_3}{2}\right) \text{ approaches 1 and } \sin\left(2p\cos\frac{\theta_1 - \theta_3}{2}\right)$$

approaches $2p\cos\frac{\theta_1 - \theta_3}{2}$ for small values of $p$.

Expanding equation (9) and neglecting the terms with coefficients $4p^2$ yields:

$$R = \cos\left(\omega_c t - 2p\cos\left(\Delta t + \frac{\theta_1 + \theta_3}{2}\right)\sin\left(\omega_c t - \frac{\theta_1 - \theta_3}{2}\right)\right). \quad (10)$$

Equation (10) can now be written as equation (8) by use of the trigonometric identity for the sine of a difference argument.

Referring back to equation (8), it should be noted that the magnitude of both the amplitude modulation and phase modulation of R depends on $(\theta_1 - \theta_3)$. Moreover, the algebraic sign of the fade induced amplitude modulation depends on the algebraic sign of $(\theta_1 - \theta_3)$.

To determine the sign of $(\theta_1 - \theta_3)$, the amplitude modulation of the received signal is detected and differentiated. The differentiated amplitude modulation is then multiplied with the frequency modulation of the received signal.

Referring to equation (8) the differentiated amplitude modulation is:

$$\frac{dAM}{dt} = -2\Delta p \sin\frac{\theta_1 - \theta_3}{2} \sin\left(\Delta t + \frac{\theta_1 + \theta_3}{2}\right) \quad (11)$$

and the frequency modulation (FM) of the received signal is $$\frac{d(\phi(t))}{dt} = FM = -2\Delta p \cos\frac{\theta_1 - \theta_3}{2} \sin\left(\Delta t + \frac{\theta_1 + \theta_3}{2}\right). \quad (12)$$

Multiplying equations (11) and (12) and extracting the dc component P we obtain:

$$P = \Delta^2 p^2 \sin(\theta_1 - \theta_3). \quad (13)$$

By use of a Taylor series truncated after the third order term to express the relation between phase shift and frequency, it can be shown that:

$$\theta_1 - \theta_3 = \frac{\alpha(1-\alpha^2)\Delta^2\tau^2 \cdot \sin(\omega_c - \omega_f)\tau}{(1 - 2\alpha\cos(\omega_c - \omega_f)\tau + \alpha^2)^2} \quad (14)$$

Examining equation (14) reveals that the sign of $(\theta_1 - \theta_3)$ depends on the sign of the product $(1-\alpha^2) \cdot \sin(\omega_c - \omega_f)\tau$. Hence, if the algebraic sign of $(\theta_1 - \theta_3)$ is known and the sign of the $\sin(\omega_c - \omega_f)\tau$ is known, the sign of $(1-\alpha^2)$ is established. Since $\alpha < 1$ for minimum phase fades and $\alpha > 1$ for non-minimum phase fades, a positive $(1-\alpha^2)$ indicates minimum phase fade and a negative $(1-\alpha^2)$ indicates non-minimum phase fade.

Figure 3:
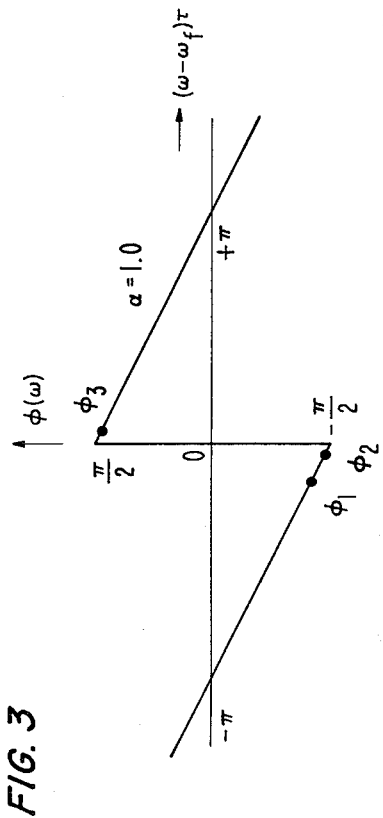
FIG. 3 is a plot of the two-path fade phase shift relative to the center of the received amplitude or phase modulated double-sideband signal vs frequency.

Examining the phase shift curves in FIG. 2 it is clear that the maximum value of $(\theta_1 - \theta_3)$ occurs when $\alpha$ approaches 1 and $\omega_c$ is just above or just below $\omega_f$. An example of $\omega_c$ falling just below $\omega_f$ for $\alpha = 1$ is shown in FIG. 3. As illustrated, $\theta_3 = \phi_3 - \phi_2$ approaches $\pi$ and $\theta_1 = \phi_2 - \phi_1$ approaches 0.

For the extreme case shown in FIG. 3, $\theta_1 - \theta_3$ approaches 180 degrees and for all other cases $\theta_1 - \theta_3 < 180$ degrees. This result indicates that the $\sin(\theta_1 - \theta_3)$ and $(\theta_1 - \theta_3)$ have the same sign. Consequently, the sign of $(\theta_1 - \theta_3)$ is the same as the sign of the dc component of product P in equation (13).

Now, as stated above, the sign of $(\theta_1 - \theta_3)$ depends on the sign of $(1-\alpha^2)\sin(\omega_c - \omega_f)\tau$. In all practical cases where:

$$(\omega_c - \omega_f)\tau < \frac{\pi}{2}; \text{ then}$$

$$\sin(\omega_c - \omega_f)\tau > 0 \text{ when } \omega_c > \omega_f \text{ and}$$

$$\sin(\omega_c - \omega_f)\tau < 0 \text{ when } \omega_c < \omega_f.$$

Therefore, the sign of $\sin(\omega_c - \omega_f)\tau$ will equal the sign $(\omega_c - \omega_f)$. Hence, if:

$$\text{sign of } (\omega_c - \omega_f) \times \text{sign of } P > 0; \quad (15)$$

the fade is minimum phase fade. Alternatively, if:

$$\text{sign of } (\omega_c - \omega_f) \times \text{sign of } P < 0; \quad (16)$$

the fade is non-minimum phase fade.

Figure 4:
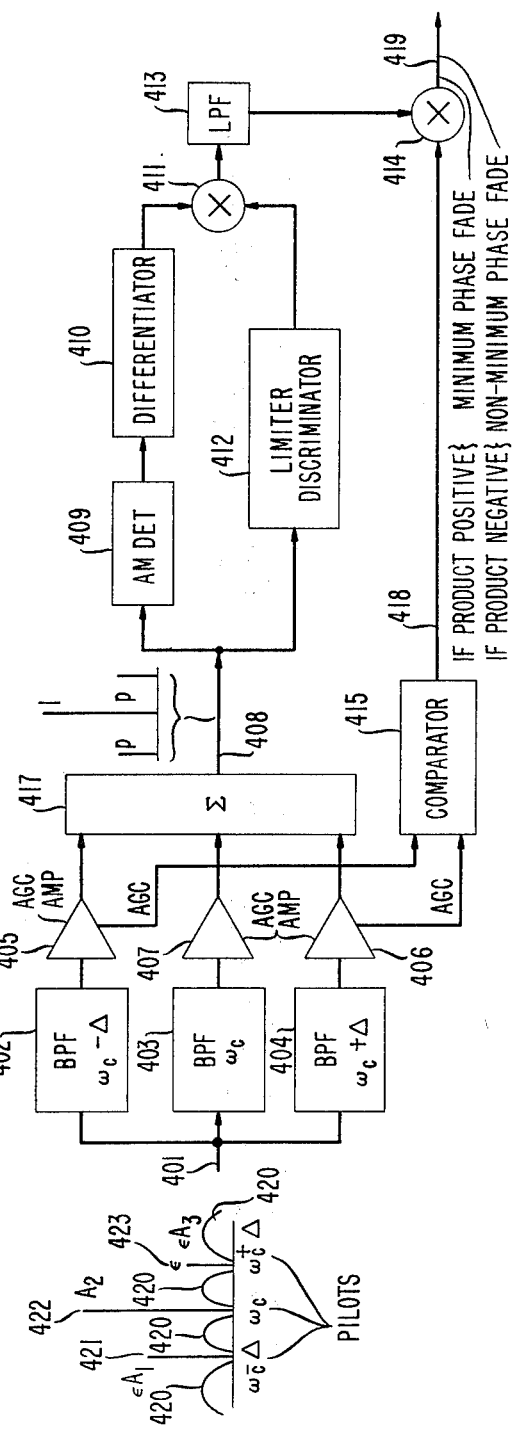
FIG. 4 is a block diagram of an embodiment of the present invention.

FIG. 4 shows a block diagram of apparatus for implementing a fade detector in accordance with equations (15) and (16). The transmitted double-sideband phase modulated signal is received on lead 401 and coupled to bandpass filters 402, 403 and 404. Filters 402, 403 and 404 respectively extract the $\omega_c - \Delta$, $\omega_c$ and $\omega_c + \Delta$ frequency components of the transmitted signal. It should be noted that the $\omega_c$ frequency component could be a recovered carrier signal with the $\omega_c + \Delta$ and $\omega_c - \Delta$ frequency components being either samples of the data signal frequency spectrum or pilot tones. Or, all three frequency components could be pilot tones inserted in an analog or digital signal frequency spectrum. In FIG. 4 the received signal on lead 401 comprises an analog data signal 420 in which three pilot tones 421, 422 and 423 are disposed. Pilot tone 422 is located at frequency $\omega_c$ and tones 421 and 423 are located at frequencies $\omega_c - \Delta$ and $\omega_c + \Delta$. Due to fading, the amplitudes of the pilot tones are typically unequal to one another and for consistency with the preceding equations are denoted as $\epsilon A_1$, $A_2$ and $\epsilon A_3$.

Automatic gain control (AGC) amplifiers 405 and 406 equalize the amplitudes of pilot tones 421 and 423 to some value $p \ll 1$. Preferably, an AGC amplifier 407 is also used to set the amplitude of pilot tone 422 to some value, e.g., 1, which is $\gg p$.

Combiner 417, connected to the output of AGC amplifiers 405, 406 and 407, sums the three received pilot tones to generate equation (8) during the presence of fading. AM detector 409 connected to lead 408, detects the amplitude modulation of the received signal which is then differentiated by differentiator 410. Limiter discriminator 412 detects the frequency modulation of the received signal on lead 408.

Multiplier 411 multiplies the differentiated amplitude modulation with the frequency modulation and supplies this product to low pass filter 413. Filter 413 extracts the dc component of product P, defined by equation (13), and supplied the same to multiplier 414. Multiplier 414 then multiplies this dc component by the signal on lead 418.

The signal on lead 418, generated by comparator 415, denotes the location of $\omega_f$ relative to $\omega_c$. Comparator 415 is supplied with the AGC voltages from AGC amplifiers 405 and 406. When $\omega_f < \omega_c$, the AGC voltage from amplifier 405 is greater than the AGC voltage from amplifier 406 and comparator 415 generates a logical "1" signal on lead 418. Alternatively, when $\omega_f > \omega_c$, the AGC voltage from amplifier 406 is greater than the AGC voltage from amplifier 405 and comparator 415 generates a logical "−1" on lead 418. It should, of course, be noted that a determination of the location of $\omega_f$ relative to $\omega_c$ could also be made by comparing the amplitudes of the $\omega_c + \Delta$ and $\omega_c - \Delta$ components before they are equalized. This is easily accomplished by merely having comparator 415 operate on the signal amplitudes at the outputs of filters 402 and 404.

The polarity of the signal on output lead 419 indicates the fade character. A positive polarity indicates minimum phase fade while a negative polarity indicates non-minimum phase fade. The absence of a signal on lead 419 is not indicative of the fade character and should be ignored.

Consider now the case of amplitude modulation to phase modulation conversion caused by fading. This requires a transmitted amplitude modulated signal. We will again assume that by suitable choice of signal spectrum samples or by the use of pilot tones we can create a transmitted signal $T(\omega)$ which can be expressed by:

$$T(\omega) = \cos\omega_c t + \epsilon\cos[\omega_c - \Delta]t + \epsilon\cos[\omega_c + \Delta]t \quad (17)$$

where $\epsilon << 1$;
$\omega_c$ is a frequency of the transmitted signal spectrum; and $\Delta$ is the modulation frequency.

Equation (17) represents a double-sideband amplitude modulated signal where the first term is the center component at frequency $\omega_c$ and the second and third terms represent the lower and upper sidebands at frequencies $\omega_c - \Delta$ and $\omega_c + \Delta$.

Now, if the signal of equation (17) is transmitted, fading will cause amplitude and phase dispersion yielding a received signal R of the form:

$$R = A_2\cos(\omega_c t + \phi_2) + \epsilon A_1\cos((\omega_c - \Delta)t + \phi_1) + \epsilon A_3\cos((\omega_c + \Delta)t + \phi_3); \quad (18)$$

where $A_1$, $A_2$ and $A_3$ respectively represent the amplitude distortion of the lower sideband, center component and upper sideband caused by fading; and $\phi_1$, $\phi_2$ and $\phi_3$ respectively represent the fade-induced phase shift of the lower sideband, center component and upper sideband, each relative to its unfaded state.

Equalization of the amplitudes of the lower and upper sidebands ($\epsilon A_1$ and $\epsilon A_3$) to $p << 1$ and setting $A_2 = 1$, yields:

$$R = \cos(\omega_c t + \phi_2) + p\cos((\omega_c - \Delta)t + \phi_1)) + p\cos((\omega_c + \Delta)t + \phi_3)). \quad (19)$$

Phase shifts $\phi_1$ and $\phi_3$ can be referenced to $\phi_2$ by defining:

$$\theta_3 = \phi_3 - \phi_2$$
$$\theta_1 = \phi_2 - \phi_1$$

Substituting $\theta_1$ and $\theta_3$ for $\phi_1$, $\phi_2$ and $\phi_3$ into equation (19) yields:

$$R = \cos\omega_c t + p\cos((\omega_c - \Delta)t - \theta_1) + p\cos((\omega_c + \Delta)t + \theta_3). \quad (20)$$

The received signal of equation (20) has amplitude modulation and phase modulation and can be expressed in the form:

$$R = \left(1 + 2p\cos\frac{\theta_1 - \theta_3}{2} \cos\left(\Delta t + \frac{\theta_1 + \theta_3}{2}\right)\right) \times \quad (21)$$

$$\cos\left(\omega_c t - 2p\sin\frac{\theta_1 - \theta_3}{2} \cos\left(\Delta t + \frac{\theta_1 + \theta_3}{2}\right)\right).$$

where $2p\cos\dfrac{\theta_1 - \theta_3}{2} \cos\left(\Delta t + \dfrac{\theta_1 + \theta_3}{2}\right)$ is the amplitude modulation of the received signal;

$2p\cos\dfrac{\theta_1 - \theta_3}{2}$ is the magnitude of the amplitude modulation;

$-2p\sin\dfrac{\theta_1 - \theta_3}{2} \cos\left(\Delta t + \dfrac{\theta_1 + \theta_3}{2}\right)$ is the phase modulation of the received signal; and $-2p\sin\dfrac{\theta_1 - \theta_3}{2}$ is the magnitude of the phase modulation.

An examination of equation (21) reveals that, as in the case of a transmitted double-sideband phase modulated signal, the algebraic sign of the fade induced phase modulation depends on the algebraic sign of $(\theta_1 - \theta_3)$. As shown previously, the sign of $(\theta_1 - \theta_3)$ depends on the sign of the product $(1 - \alpha^2)\sin(\omega_c - \omega_f)\tau$. To determine the sign of $(\theta_1 - \theta_3)$, the amplitude modulation of the received signal is differentiated and multiplied by the frequency modulation of the received signal.

The differentiated amplitude modulation of the received signal of equation (21) is:

$$\frac{dAM}{dt} = -2\Delta p\cos\frac{\theta_1 - \theta_3}{2} \sin\left(\Delta t + \frac{\theta_1 + \theta_3}{2}\right). \quad (22)$$

The frequency modulation of the received signal of equation (21) is:

$$FM = 2\Delta p\sin\frac{\theta_1 - \theta_3}{2} \sin\left(\Delta t + \frac{\theta_1 + \theta_3}{2}\right). \quad (23)$$

If the frequency modulation is multiplied by the differentiated amplitude modulation, the dc component, P, is:

$$P = -\Delta^2 p^2 \sin(\theta_1 - \theta_3). \quad (24)$$

It should be noted the dc component of equation (24) is identical in terms but opposite in sign to the dc component of equation (13). Equation (13) was derived for the case where the transmitted signal comprises double-sideband phase modulated signal. The circuitry shown in FIG. 4 can, therefore, be used to determine the fade character when the transmitted signal comprises a double-sideband amplitude modulated signal except that because of the sign inversion, the interpretation of the results is inverted. Consequently, when the transmitted signal comprises a double-sideband amplitude modulated signal, minimum phase fade is present when the polarity of the signal on lead 419 is negative and non-minimum phase fade is present when the polarity is positive.

What is claimed is:

1. A fade character detector for use in a radio receiver adapted to receive an incoming radio signal comprising a phase modulated double-sideband signal having a predetermined modulation rate, said phase modulated signal being amplitude modulated at said rate by fading along with having maximum amplitude attenuation at a fade notch frequency, said fade character detector being characterized by means (e.g., 402, 403, 404, 405, 406, 407, 417, 409, 410, 411, 412, 413) responsive to said phase modulated signal for determining an algebraic sign of the fade induced amplitude modulation;

means (e.g., 402, 404, 405, 406, 415) responsive to said phase modulated signal for determining the location of the fade notch frequency relative to the center of the double-sideband signal frequency spectrum; and means (e.g., 414) responsive to the determined fade notch frequency location and the determined algebraic sign for determining when the fade is minimum phase fade and when the fade is non-minimum phase fade.

2. The fade character detector of claim 1 wherein said algebraic sign determining means detects and differentiates the amplitude modulation.

3. The fade character detector of claim 2 wherein said algebraic sign determining means differentiates the phase modulation.

4. The fade character detector of claim 3 where said algebraic sign determining means multiplies the differentiated amplitude modulation with the differentiated phase modulation to form a product having a dc component.

5. The fade character detector of claim 4 wherein said algebraic sign determining means extracts said dc component from said product.

6. A fade character detector for use in a radio receiver adapted to receive an incoming radio signal comprising an amplitude modulated double-sideband signal having a predetermined modulation rate, said amplitude modulated signal being phase modulated at said rate by fading along with having maximum amplitude attenuation at a fade notch frequency, said fade character detector being characterized by means (e.g., 402, 403, 404, 405, 406, 407, 417, 409, 410, 411, 412, 413) responsive to said amplitude modulated signal for determining an algebraic sign of the fade induced phase modulation;

means (e.g., 402, 404, 405, 406, 415) responsive to said amplitude modulated signal for determining the location of the fade notch frequency relative to the center of the double-sideband signal frequency spectrum; and means (e.g., 414) responsive to the determined fade notch frequency location and the determined algebraic sign for determining when the fade is minimum phase fade and when the fade is non-minimum phase fade.

7. The fade character detector of claim 6 wherein said algebraic sign determining means detects and differentiates amplitude modulation.

8. The fade character detector of claim 7 wherein said algebraic sign determining means differentiates the phase modulation.

9. The fade character detector of claim 8 wherein said algebraic sign determining means multiplies the differentiated amplitude modulation and the differentiated phase modulation to form a product having a dc component.

10. The fade character detector of claim 9 wherein said algebraic sign determining means extracts said dc component from said product.

11. A method of determining the fade character of a radio signal comprising a phase modulated double-sideband signal, said phase modulated signal being amplitude modulated at said rate by fading along with having maximum amplitude attenuation at a fade notch frequency, said method being characterized by the steps of determining an algebraic sign of the fade induced amplitude modulation;

determining the location of the fade notch frequency relative to the center of the double-sideband signal; and examining the determined algebraic sign and the determined fade notch location to determine when the fade is minimum phase fade and when the fade is non-minimum phase fade.

12. A method of determining the fade character of a radio signal comprising an amplitude modulated double-sideband signal, said amplitude modulated signal being phase modulated at said rate by fading along with having maximum amplitude attenuation at a fade notch frequency, said method being characterized by the steps of determining an algebraic sign of the fade induced phase modulation;

determining the location of the fade notch frequency relative to the center of the double-sideband signal; and examining the determined algebraic sign and the determined fade notch location to determine when the fade is minimum phase fade and when the fade is non-minimum phase fade.

* * * * *